| United States Patent [19] | [11] Patent Number: 4,732,602 |
| Dakan et al. | [45] Date of Patent: Mar. 22, 1988 |

[54] BRONZE ALLOY FOR GLASS CONTAINER MOLDS

[75] Inventors: John F. Dakan, Elkins, W. Va.; Donald G. Schmidt, Hinsdale, Ill.

[73] Assignee: Kelly Machine & Foundry, Elkins, W. Va.

[21] Appl. No.: 878,616

[22] Filed: Jun. 26, 1986

[51] Int. Cl.$^4$ ................................................ C22C 9/06
[52] U.S. Cl. ................................... 65/374.12; 65/305; 65/374.11; 249/135; 420/486; 420/487
[58] Field of Search ................ 65/374.12, 305, 374.11; 249/135; 420/486, 487

[56] References Cited

U.S. PATENT DOCUMENTS 3,258,334 6/1966 Kessler ................................. 420/486
4,594,117 6/1986 Pryor et al. .......................... 420/486

FOREIGN PATENT DOCUMENTS 7329449R 12/1964 Japan ................................... 420/486
0018507 2/1980 Japan ................................... 420/486

*Primary Examiner*—Arthur Kellogg
*Attorney, Agent, or Firm*—Michael J. Weins; Janine J. Weins

[57] ABSTRACT

This invention relates to a copper base alloy with improved toughness and weldability for use in making molds for glass containers. The alloy of the present invention contains copper, nickel and aluminum and may have intentional additions of iron for grain refinement and niobium for increased oxidation resistance. It is felt that niobium should be added when the alloy is to be welded under adverse conditions. The nickel content sould be between about 12 and 16 wt/o and the aluminum content between about 8.5 and 11.5 wt/o. If the aluminum content is above or below the range, and/or the nickel content is near or above 16 wt/o the alloy may have excessive hardness. Iron additions for grain refinement should be up to about 1.0 wt/o. The niobium, when added to improve weldability, should be maintained between about 0.5 and 1.0 wt/o.

20 Claims, No Drawings

BRONZE ALLOY FOR GLASS CONTAINER MOLDS

DESCRIPTION

1. Field of Invention

The present invention relates to a copper base alloy for use in making glass container molds with improved machinability, weldability, and heat transfer properties.

2. Background

Glass containers are frequently made by blow molding a glass gob. In this process a glass gob enters a blank mold at about 1100° C. The glass gob is blown to conform to the mold pattern and then air cooled within the mold. Finally the molded glass is removed from the mold.

It is preferred that glass container molds have relatively high thermal diffusivity, thermal shock resistance, oxidation resistance and that the molds not undergo undue dimensional changes in the temperature range at which the mold is used. In addition, the mold must be capable of being machined to a smooth finish from which the glass container can readily break away.

Glass container molds are frequently made from copper base alloys. A number of different alloy compositions are used for the molds. One of the copper base alloys currently used is a zinc bearing copper alloy which nominally contains 10 wt/o Al; 15 wt/o Ni; 0.5 wt/o Fe; 9 wt/o Zn; 0.2 wt/o Pb with the balance copper wherein wt/o denotes weight percent. This alloy has a good combination of tensile strength, elongation and hardness. The mold life of the alloy is satisfactory, however the high zinc and lead contents make the alloy difficult to weld.

The undesirable welding response associated with relatively high zinc and lead contents have, in part, been overcome by the alloy taught in U.S. Pat. No. 3,258,334 of Edward B. Kessler entitled "COPPER BASE ALLOY". The U.S. Pat. No. 3,258,334 teaches an alloy which has cobalt substituted for zinc and is low in tin and is essentially lead and zinc free. The alloy of the U.S. Pat. No. 3,258,334 contains 13.5 to 16.5 wt/o Ni; 9.0 to 11.0 wt/o Al; 1.0 to 2.0 wt/o Co; 0.4 to 1.0 wt/o Fe; 0.005 wt/o Pb maximum; 0.02 wt/o Sn maximum; and arsenic, bismuth, potassium, sulphur and zinc totalling not more than 0.25 wt/o. The commercial alloy based on the U.S. Pat. No. 3,258,334 has a hardness in excess of Brinell 200, and thus is difficult to machine. Further, since cobalt is not an alloying element present in most copper base alloys the scrap can not be used for most other alloys.

A more recent approach to eliminating high lead and high zinc in glass container mold alloys is found in U.S. Pat. No. 4,436,544 of Thomas W. Mc Causland entitled: "ALUMINUM BRONZE GLASS MAKING MOLDS". The U.S. Pat. No. 4,436,544 teaches and claims an aluminum bronze glass container mold alloy which contains additions of manganese, nickel, iron, aluminum and is essentially free of zinc and lead. The alloy of the U.S. Pat. No. 4,436,544 exhibits superior wear resistance, durability, resistance to pitting, and improved oxidation resistance when compared to prior art alloys for glass container molds. In addition, the alloy of the U.S. Pat. No. 4,436,544 has good thermal conductivity and relatively high hardness in combination with high ductility. This high ductility, which is greater than 15 wt/o, in combination with high hardness, makes the alloy difficult to machine.

A number of other patents including U.S. Pat. No. 3,901,692 of Tsuneaki Mikawa entitled "CORROSION RESISTANT COPPER ALLOY METHOD OF FORMING THE SAME"; U.S. Pat. No. 3,297,437 of Leendert Bosman entitled "COPPER BASE ALLOY CONTAINING MANGANESE AND ALUMINUM"; and U.S. Pat. No. 2,870,051 entitled "METHOD OF HEAT TREATING ALUMINUM BRONZE ALLOY AND PRODUCTS THEREOF" of John Klementz teach copper base alloys suitable for use in the making of glass container molds.

Although the alloys discussed above have been used in making glass container molds, there is a need for an alloy having an improved combination of physical properties, high thermal conductivity, increased wear resistance and good oxidation resistance.

SUMMARY OF INVENTION

It is an object of this invention to provide a copper base alloy suitable for glass container molds having a relative low lead and low zinc content.

It is another object of the invention to provide a copper base alloy having relatively high strength, and intermediate elongation and hardness.

It is still another object of the invention to provide a cooper base alloy with good machinability, and thermal stability.

Yet another object of this invention is to provide a copper base alloy with high thermal conductivity.

This invention relates to a copper base alloy with improved machinability, toughness, weldability and heat transfer properties for use in making glass container molds.

The alloy of the present invention contains copper, nickel and aluminum; and may have intentional additions of iron for grain refinement; and niobium for increased oxidation resistance. The nickel content should be between about 12 wt/o and 16 wt/o; the aluminum content between about 8.5 wt/o and 11.5 wt/o with the preferred range of aluminum being between about 8.5 wt/o and 10.5 wt/o to assure sufficient ductility. It is further preferred that the nickel range be limited to between 14 wt/o and 15 wt/o to insure that the alloy is readily machinable. To assure oxidation resistance the nickel content should be 14 wt/o or greater. An iron addition of up to 1.0 wt/o is effective for grain refining. The niobium additions should be between about 0.5 wt/o and 1.0 wt/o when the alloy is to be welded under adverse conditions.

The alloy of the present invention can contain incidental impurities typically found in copper base alloys. These impurities may include tin, lead, zinc, antimony, sulphur, phosphorus and manganese, with the lead and zinc addition limited to 0.010 wt/o maximum to assure weldability. The lead limit also assures that the alloy can be chill cast.

BEST MODE OF CARRYING THE INVENTION INTO PRACTICE

The present invention relates to a copper base alloy with improved toughness and weldability for use in making molds for glass containers and to the molds made from such alloy.

The alloy of the present invention contains copper, nickel and aluminum. The alloy may have intentional additions of iron for grain refinement and niobium for increased oxidation resistance. The nickel content should be between about 12 wt/o and 16 wt/o and the aluminum content between about 8.5 wt/o and 11.5 wt/o. When the nickel and aluminum additions are outside the recommended range it is found that the alloy may become excessively hard. If the alloy is excessively hard then molds made from the alloy would be difficult to machine.

By further limiting the aluminum content to between about 8.5 wt/o and 10.5 wt/o the ductility of alloy can be substantially increased without adversely affecting the hardness or tensile properties.

When the alloy of the present invention has between about 12 wt/o and 15 wt/o Ni and between about 8.5 wt/o and 10.5 wt/o aluminum, the alloy in the as cast condition will have a Brinell hardness below about 200.

An alloy having a Brinell hardness of less than 200 will have good machinability.

It is preferred that the nickel content be maintained at 14 wt/o or greater to assure oxidation resistance.

Iron additions of up to about 1.0 wt/o are effective in grain refining and for avoiding grain growth during thermal processing.

When the alloy of the present invention is to be welded under adverse conditions the niobium content should be between about 0.5 wt/o and 1.0 wt/o to reduce oxidation during welding.

The alloy of the present invention has a combination of properties which make the alloy suitable for glass container molds. For glass container molds of the alloy of the present invention it has been found that the properties of the mold are enhanced by casting the alloy against a chill such as cast iron to produce a chilled casting. Cast iron molds have been found effective as a chill mold. Chill casting reduces the shrinkage in the resulting casting and thus provides for a fine grain structure. A fine grain structure without shrinkage has increased soundness, strength and elongation.

Subsequent to casting, the alloy should be heat treated at about 1600±50° F. for a period of between 4 and 6 hours and then furnace cooled. This procedure removes thermal strains and produces a stable microstructure.

In order to illustrate the merits of the alloy of the present invention, the following examples have been prepared. Table I gives the chemical composition of nine zinc bearing alloys outside the range of the present invention. The alloys were cast in Y blocks with cast iron chills. Example 9 has the nominal composition of the prior art zinc bearing copper alloy discussed in the background art.

Table II summarizes the mechanical properties of the alloys of Table I. In general, the alloys have a Brinell hardness of over 200, and a tensile strength in the vicinity of 100 ksi. The elongations vary from about 2.5 wt/o to 10 wt/o.

TABLE I

| | CHEMICAL COMPOSITION OF ALLOYS TESTED COMPOSITION IN WEIGHT PERCENT | | | | | | | | | | |
|---|---|---|---|---|---|---|---|---|---|---|---|
| Example | Sn | Pb | Zn | Fe | Ni | Al | Si | Mn | Sb | S | P |
| 1 | 0.02 | 0.04 | 8.44 | 0.36 | 10.29 | 9.84 | <0.01 | 0.02 | — | — | — |
| 2 | <.02 | 0.20 | 8.9 | 0.24 | 10.6 | 10.19 | <0.01 | 0.02 | <.01 | <.01 | 0.003 |
| 3 | 0.01 | <.01 | 8.71 | 0.36 | 10.29 | 9.84 | <0.01 | 0.02 | — | — | — |
| 4 | 0.02 | 0.20 | 8.61 | 4.39 | 11.12 | 9.93 | 0.01 | 0.04 | <.01 | 0.006 | 0.001 |
| 5 | 0.01 | 0.01 | 9.01 | 0.32 | 10.71 | 9.89 | <0.01 | 2.34 | <.01 | — | — |
| 6 | 0.01 | 0.01 | 8.83 | 0.33 | 10.87 | 10.05 | <0.01 | 1.99 | <.01 | 0.002 | — |
| 7 | 0.01 | <.01 | 9.26 | 3.77 | 11.17 | 10.47 | <0.01 | 1.98 | <.01 | <.01 | <.001 |
| 8 | <.02 | 0.20 | 8.9 | 0.24 | 10.6 | 10.19 | <0.01 | 0.02 | <.01 | <.01 | 0.003 |

TABLE II

| PHYSICAL PROPERTIES FOR EXAMPLES OF TABLE I | | | |
|---|---|---|---|
| | TS | ELONG. | HARDNESS |
| 1 | 101 | 5.6 | 209 |
| 2 | 99.4 | 6.0 | 207 |
| 3 | 100.4 | 5.2 | 217 |
| 4 | 101.2 | 5.8 | 213 |
| 5 | 102.2 | 2.55 | 241 |
| 6 | 95.2 | 3.75 | 217 |
| 7 | 93 | 3.45 | 218.5 |
| 8 | 91.4 | — | 245.6 |

Table III summarizes the chemistry for a series of alloys which are essentially lead and zinc free. Examples 11-22 were cast in Y blocks with a cast iron chill while Example 10 was a sand cast alloy.

The properties of the as cast alloys, as well as the properties of the alloys after heat treatment at 1600° F. followed by furnace cooling, are reported in Table IV.

TABLE III

| | CHEMICAL COMPOSITION OF ALLOYS TESTED IN WEIGHT PERCENT | | | | | | | | | | |
|---|---|---|---|---|---|---|---|---|---|---|---|
| EXAMPLE | Sn | Pb | Zn | Fe | Ni | Al | Si | Mn | Sb | S | P |
| 10 | <0.01 | <0.01 | <0.01 | 0.37 | 14.54 | 9.72 | <0.01 | 0.07 | <0.01 | — | — |
| 11 | <0.01 | <0.01 | <0.01 | 0.39 | 15.07 | 9.63 | <0.01 | 0.07 | <0.01 | — | — |
| 12 | <0.01 | <0.01 | <0.01 | 0.37 | 14.16 | 8.35 | 0.05 | 0.13 | — | — | — |
| 13 | <0.01 | 0.01 | <0.01 | 0.38 | 14.66 | 7.01 | 0.05 | 0.13 | — | — | — |
| 14 | <0.01 | <0.01 | <0.01 | 0.51 | 15.55 | 8.64 | 0.04 | 0.06 | — | — | — |
| 15 | <0.01 | <0.01 | <0.01 | 0.50 | 15.23 | 9.31 | 0.04 | 0.05 | — | — | — |
| 16 | <0.01 | <0.01 | <0.01 | 0.78 | 14.70 | 10.61 | <0.01 | 0.07 | — | — | — |
| 17 | <0.01 | <0.01 | <0.01 | 0.79 | 14.77 | 11.45 | <0.01 | 0.07 | — | — | — |
| 18 | <0.01 | 0.01 | <0.01 | 0.47 | 19.98 | 7.18 | 7.18 | 0.06 | 0.11 | — | — |
| 19 | <0.01 | <0.01 | <0.01 | 0.46 | 19.89 | 8.36 | 0.04 | 0.10 | — | — | — |
| 20 | <0.01 | <0.01 | <0.01 | 0.33 | 14.29 | 5.02 | 0.03 | 0.06 | — | — | — |
| 21 | <0.01 | <0.01 | <0.01 | 0.40 | 13.99 | 8.13 | 0.17 | 0.18 | — | — | — |
| 22 | <0.01 | <0.01 | <0.01 | 0.36 | 14.96 | 4.16 | 0.03 | 0.09 | — | — | — |

TABLE IV

PHYSICAL PROPERTIES OF ALLOYS OF TABLE III

| | AS CAST | | | HEAT TREATED 1600° F. | | |
|---|---|---|---|---|---|---|
| EXAMPLE | TS | ELONG | BHN | TS | ELONG | BHN |
| 10 | 80.4 | 10.8 | 179 | 82.2 | 7.2 | 187 |
| 11 | 93.8 | 9.5 | 207 | 84.7 | 9.2 | 187 |
| 12 | 99.2 | 2.3 | 241 | 80.3 | 8.2 | 187 |
| 13 | 104.1 | 3 | 255 | 92.4 | 7.5 | 187 |
| 14 | 96.2 | 13.3 | 217 | 84.1 | 10.2 | 179 |
| 15 | 81.3 | 7.5 | 217 | 83.3 | 8.1 | 143 |
| 16 | 74.9 | 5.0 | 187 | 88.1 | 7 | 182 |
| 17 | 82.9 | 2.8 | 207 | 85.4 | 5.3 | 187 |
| 18 | — | — | 277 | — | — | — |
| 19 | — | — | 241 | — | — | — |
| 20 | — | — | 241 | — | — | — |
| 21 | — | — | 255 | — | — | — |
| 22 | — | — | 255 | — | — | — |

A review of Table IV shows that Examples 12, 13, 18, 19, 20, 21, and 22 have a hardness in excess of 241. Due to the excessive as cast hardness no tensile samples were made and the alloys of these examples were not heat treated. The nickel and aluminum levels of these examples are outside the limits of the present invention.

Examples 10, 11, 14, 15, 16, and 17 all have nickel and aluminum contents which fall within the range for the alloy of the present invention.

It can be seen from Table IV that Examples 16 and 17 have elongations of 5 wt/o or less. These examples have an aluminum content in excess of 10.5 wt/o. Thus, by reducing the content of nickel to 12-16 wt/o and the content of aluminum to 8.5-10.5 wt/o, the elongation of the resulting cast alloy will be in excess of 5 wt/o.

Examples 14 and 15 have a hardness in excess of Brinell 210, while Examples 10, 11, and 16, which have a nickel content less than or equal to about 15 wt/o, have a Brinell hardness less than 210. It is preferred that the nickel and aluminum content be maintained within the limits of 12-15 wt/o Ni and 8.5-10.5 wt/o Al to assure a hardness which will facilitate machining.

The low hardness of the as cast structure of Example 10 results from sand casting the alloy. The cast structure has porosity which is reflected in a decrease in strength and elongation of the heat treated alloy as compared to the values of Example 11.

While the novel features of this invention have been described in terms of preferred embodiments and particular applications, it will be appreciated that various omissions and substitutions in form and in detail of the alloy of the present invention may be made by those skilled in the art without departing from the spirit of the invention.

What we claim is:

1. A glassmaking mold part adopted for use in glassware forming machines which comprises a substantially copper alloy consisting essentially of:
   12-16 wt/o Ni; 8.5-11.5 wt/o Al, where wt/o denotes weight percent; with the balance being copper except for impurities typically found in copper base alloys including Sn, Pb, Zn, Sb, Si, S, P, Fe, Mn, and Nb; with the proviso that the Pb and Zn contents are less than 0.01.

2. The mold part of claim 1 wherein the Ni content is further limited to between 14 and 16 wt/o.

3. The mold part of claim 2 wherein the Al content is further limited to between 8.5 and 10.5 wt/o.

4. The mold part of claim 3 wherein the Ni is further limited to between about 14 and 15 wt/o.

5. The mold part of claim 4 wherein the Fe is up to about 1 wt/o.

6. The mold part of claim 1 wherein the part is chill cast and subsequently annealed at about 1600° F.±50° F. and thereafter furnace cooled.

7. The mold part of claim 2 wherein the part is chill cast and subsequently annealed at about 1600° F.±50° F. and thereafter furnace cooled.

8. The mold part of claim 3 wherein the part is chill cast and subsequently annealed at about 1600° F.±50° F. and thereafter furnace cooled.

9. The mold part of claim 4 wherein the part is chill cast and subsequently annealed at about 1600° F.±50° F. and thereafter furnace cooled.

10. The mold part of claim 5 wherein the part is chill cast and subsequently annealed at about 1600° F.±50° F. and thereafter furnace cooled.

11. A substantially copper alloy well suited for welding consisting essentially of:
    12-16 wt/o Ni; 8.5-11.5 wt/o Al, where wt/o denotes weight percent; with the balance being copper except for impurities typically found in copper base alloys including Sn, Pb, Zn, Sb, Si, S, P, Fe, and Mn; with the proviso that the Pb and Zn contents are less than 0.01.

12. The alloy of claim 11 wherein the Ni content is further limited to between 14 and 16 wt/o.

13. The alloy of claim 12 wherein the Al content is further limited to between 8.5 and 10.5 wt/o.

14. The alloy of claim 13 wherein the Ni is further limited to between about 14 and 15 wt/o.

15. The alloy of claim 14 wherein the Fe is up to about 1 wt/o.

16. The alloy of claim 15 wherein the Nb is present at levels of between 0.5 and 1.0 wt/o.

17. The alloy of claim 14 wherein the alloy is chill cast and subsequently annealed at between about 1600° F.±50° F. and thereafter furnace cooled.

18. The alloy of claim 15 wherein the alloy is chill cast and subsequently annealed at between about 1600° F.±50° F. and thereafter furnace cooled.

19. A weldable glass mold part adopted for use in glassware forming machines which comprises a substantially copper alloy consisting essentially of:
    12-16 wt/o Ni; 8.5-11.5 wt/o Al; 0.5-1.0 wt/o Nb, where wt/o denotes weight percent; with the balance being copper except for impurities typically found in copper base alloys including Sn, Pb, Zn, Sb, Si, S, P, Fe, and Mn; with the proviso that the Pb and Zn contents are less than 0.01.

20. The mold part of claim 19 wherein the part is chill cast and subsequently annealed at about 1600° F.±50° F. and thereafter furnace cooled.

* * * * *